(12) United States Patent  
Bacon et al.

(10) Patent No.: US 8,856,491 B2  
(45) Date of Patent: Oct. 7, 2014

(54) GARBAGE COLLECTION IMPLEMENTED IN HARDWARE

(75) Inventors: David F. Bacon, New York, NY (US); Perry S. Cheng, Cambridge, MA (US); Sunil K. Shukla, Tarry Town, NY (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 13/478,614

(22) Filed: May 23, 2012

(65) Prior Publication Data

US 2013/0318290 A1     Nov. 28, 2013

(51) Int. Cl.
| | |
|---|---|
| G06F 12/00 | (2006.01) |
| G06F 17/30 | (2006.01) |
| G06F 13/00 | (2006.01) |
| G06F 13/28 | (2006.01) |

(52) U.S. Cl.  
USPC ............................ 711/216; 707/813; 711/149

(58) Field of Classification Search  
CPC ............ G06F 12/0253; G06F 12/0269; G06F 12/0261; G06F 13/1657; G06F 13/18; G11C 7/1075  
USPC .......................................................... 707/813  
See application file for complete search history.

(56) References Cited

U.S. PATENT DOCUMENTS

| | | | |
|---|---|---|---|
| 7,254,677 B1 * | 8/2007 | Lowe et al. .................... | 711/118 |
| 7,921,143 B2 | 4/2011 | Dussud et al. | |
| 2004/0024798 A1 * | 2/2004 | Chauvel ........................ | 707/206 |
| 2004/0153885 A1 * | 8/2004 | Chauvel et al. ................. | 714/54 |
| 2011/0066832 A1 * | 3/2011 | Casselman et al. ............ | 712/231 |
| 2011/0231628 A1 * | 9/2011 | Gelter et al. ................... | 711/171 |
| 2011/0264880 A1 * | 10/2011 | Ylonen .......................... | 711/162 |
| 2013/0212548 A1 * | 8/2013 | Muddu et al. ................. | 716/112 |

OTHER PUBLICATIONS

Adler et al., "Leap scratchpads: automatic memory and cache management for reconfigurable logic." In FPGA, pp. 25-28, 2011.

J. Auerbach, D.F. Bacon, P. Cheng, and R. Rabbah. "Lime: a Java-compatible and synthesizable language for heterogeneous architectures." In OOPSLA, pp. 89-108, 2010.

D.F. Bacon, P. Cheng, and V.T. Rajan. "A real-time garbage collector with low overhead and consistent utilization." In POPL, pp. 285-298, Jan. 2003.

H.G. Baker. "List processing in real-time on a serial computer." Commun. ACM, 21(4): 280-294, Apr. 1978.

(Continued)

*Primary Examiner* — April Y Blair  
*Assistant Examiner* — Daniel A Dersarkissian  
(74) *Attorney, Agent, or Firm* — Cantor Colburn LLP; William Stock (57) ABSTRACT

A computing device is provided and includes a memory module, a sweep engine, a root snapshot module, and a trace engine. The memory module has a memory implemented as at least one hardware circuit. The memory module uses a dual-ported memory configuration. The sweep engine includes a stack pointer. The sweep engine is configured to send a garbage collection signal if the stack pointer falls below a specified level. The sweep engine is in communication with the memory module to reclaim memory. The root snapshot engine is configured to take a snapshot of roots from at least one mutator if the garbage collection signal is received from the sweep engine. The trace engine receives roots from the root snapshot engine and is in communication with the memory module to receive data.

24 Claims, 6 Drawing Sheets

(56) References Cited

OTHER PUBLICATIONS

A. Berlea, et al., "Garbage Collection for the Delft Java Processor," In 8th IASTED International Conference on Applied Informatics, pp. 1-7, 2000.

G.E. Blelloch and P. Cheng. "On bounding time and space for multiprocessor garbage collection." In PLDI, pp. 104-117, Jun. 1999.

Chen-Yong Cher, et al., "Software Prefetching for Mark-Sweep Garbage Collection: Hardware Analysis and Software Redesign," ASPLOS, ACM, pp. 1-12; 2004.

C. Click, G. Tene, and M. Wolf. "The pauseless GC algorithm." In VEE, pp. 46-56, 2005.

B. Cook et al. "Finding heap-bounds for hardware synthesis." In FMCAD, pp. 205-212, Nov. 2009.

P. Faes, M. Christiaens, D. Buytaert, and D. Stroobandt. "FPGA aware garbage collection in Java." In FPL, pp. 675-680, 2005.

D. Greaves and S. Singh. "Kiwi: Synthesis of FPGA circuits from parallel programs." In FCCM, 2008.

Flavius Gruian, et al, "Designing a Concurrent Hardware Garbage Collector for Small Embedded Systems," Advances in Computer Systems Architecture, Lecture Notes in Computer Science, 2005, vol. 3740/2005, pp. 281-294.

T. H. Heil and J. E. Smith. "Concurrent garbage collection using hardware-assisted profiling." In ISMM, pp. 80-93, 2000.

R. Henriksson. "Scheduling Garbage Collection in Embedded Systems." PhD thesis, Lund Institute of Technology, Jul. 1998, pp. 1-174.

Matthew Hertz, et al., "Quantifying the Performance of Garbage Collection vs. Explicit Memory Management," OOPSLA, ACM, pp. 1-14, 2005.

Oswin Horvath et al, "Fine-Grained Parallel Compacting Garbage Collection Through Hardware-Supported Synchronization," 39th International Conference on Parallel Processing Workshops, 2010, pp. 1-9.

J. A. Joao, O. Mutlu, and Y. N. Patt. "Flexible reference-counting-based hardware acceleration for garbage collection." In ISCA, pp. 418-428, 2009.

Levy, "Intel iAPX 432." Capability-Based Computer Systems, Digital Press, 1984, pp. 1-28.

J. McCarthy. "Recursive functions of symbolic expressions and their computation by machine." Commun. ACM, 3 (4):184-195, 1960.

Mentor Graphics. ModelSim SE Users Manual. Version 10.0c, pp. 1-598.

M. Meyer. An on-chip garbage collection coprocessor for embedded real-time systems.: In RTCSA, pp. 517-524, 2005.

Matthias Meyer, "A True Hardware Read Barrier," ISMM•06, Jun. 10-11, 2006, Ottawa, Ontario, Canada, ACM, 2006, pp. 1-14.

D. A. Moon. "Garbage collection in a large LISP system." In LFP, Aug. 1984, pp. 1-12.

W. J. Schmidt and K. D. Nilsen. "Performance of a hardware-assisted real-time garbage collector." In ASPLOS, pp. 76-85, 1994.

M. Schoeberl and W. Puffitsch. "Nonblocking real-time garbage collection." ACM Trans. Embedded Comput. Sys., 10:1-28, 2010.

J. Simsa and S. Singh. "Designing hardware with dynamic memory abstraction." In FPGA, pp. 69-72, 2010.

W. Srisa-an, C.-T. D. Lo, and J. M. Chang. "Active memory processor: A hardware garbage collector for real-time Java embedded devices." IEEE Trans. Mob. Comput., 2(2):89-101, 2003.

Guy Lewis Steele Jr., et al., "Design of a LISP-Based Microprocessor," 1980, pp. 1-18; ACM.

G. L. Steele, Jr. "Data representation in PDP-10 MACLISP." Tech. rep., MIT, 1977. AI Memo 420, pp. 1-13.

Gil Tene, et al., "C4: The Continuously Concurrent Compacting Collector," ISMM'11; ACM; pp. 1-10; 2011.

D. Ungar et al. "Architecture of SOAR: Smalltalk on a RISC." In ISCA, pp. 188-197, 1984.

Xilinx. "Power methodology guide." Tech. Rep. DS786, Mar. 2011, pp. 1-54.

Xilinx. "Virtex-5 family overview." Tech. Rep. DS100, Feb. 2009, pp. 1-13.

Yu Wing Shing, "Hardware concurrent garbage collection for object-oriented processor." Masters thesis, City University of Hong Kong, 2005, pp. 1-122.

T. Yuasa, "Realtime Garbage Collection on General-purpose Machines." Kyoto University; Feb. 1986; pp. 1-45.

\* cited by examiner

GARBAGE COLLECTION IMPLEMENTED IN HARDWARE

BACKGROUND

The present invention relates to memory management techniques, and more specifically, to a garbage collector that is implemented in hardware.

Frequency scaling, which is the technique of ramping processor frequency to achieve enhance performance, has led to other approaches for enhancing computing performance. One example of another approach for enhancing performance is multiple instruction, multiple data (MIMD) parallelism employing multiple processors. However, MIMD parallelism may be relatively inefficient, and consumes a relatively high amount of power. One alternative to MIMD parallelism is reconfigurable hardware such as, for example, field-programmable gate arrays (FPGA).

One drawback of FPGAs is programming methodology. The most common computer languages for FPGAs are relatively low-level hardware description languages such as, for example, very-high-speed integrated circuits hardware description language (VHDL) and Verilog. These low-level languages use abstractions that are bits, arrays of bits, registers, wires, and other hardware, which make programming FPGAs much more complex than conventional central processing units (CPUs). Thus, there is a focus on raising the level of abstraction and programmability of FPGAs to that of higher-level software based programming languages. Some examples of recent research are the Kiwi project, which automatically translates C# programs into FPGA circuits, or the Liquid Metal project that has developed the Lime language. One fundamental feature of high-level languages is automatic memory management, in the form of garbage collection (i.e., attempts to reclaim memory occupied by objects that are no longer in use by a program). However, whether a low-level language or a higher-level programming language is used, the use of garbage collection in FPGAs and other types of reconfigurable hardware structures is generally non-existent.

SUMMARY

According to one embodiment of the present invention, a computing device is provided and includes a memory module, a sweep engine, a root snapshot module, and a trace engine. The memory module has a memory implemented as at least one hardware circuit. The memory module uses a dual-ported memory configuration. The sweep engine includes a stack pointer. The sweep engine is configured to send a garbage collection signal if the stack pointer falls below a specified level. The sweep engine is in communication with the memory module to reclaim memory. The root snapshot engine is configured to take a snapshot of roots from at least one mutator if the garbage collection signal is received from the sweep engine. The trace engine receives roots from the root snapshot engine and is in communication with the memory module to receive data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment of a garbage collector implemented in computer hardware (as opposed to previous hardware-assist techniques) is disclosed. In one embodiment, a field-programmable gate array (FPGA) and an on-chip memory are disclosed. Utilizing a concurrent snapshot algorithm, the garbage collector as disclosed provides single-cycle access to the heap, and does not stall a mutator for a single cycle, thus achieving a deterministic mutator utilization (MMU) of about 100%. In various embodiments, the garbage collector as disclosed does not consume more than about 2% of the logic resources of a relatively high-end FPGA. In the embodiments as disclosed, the garbage collector may include either a stop-the-world or a fully concurrent configuration. However, when implemented in hardware, real-time collection may achieve a higher throughput, lower latency, lower memory usage, and energy consumption when compared to the stop-the-world configuration.

Figure 1:
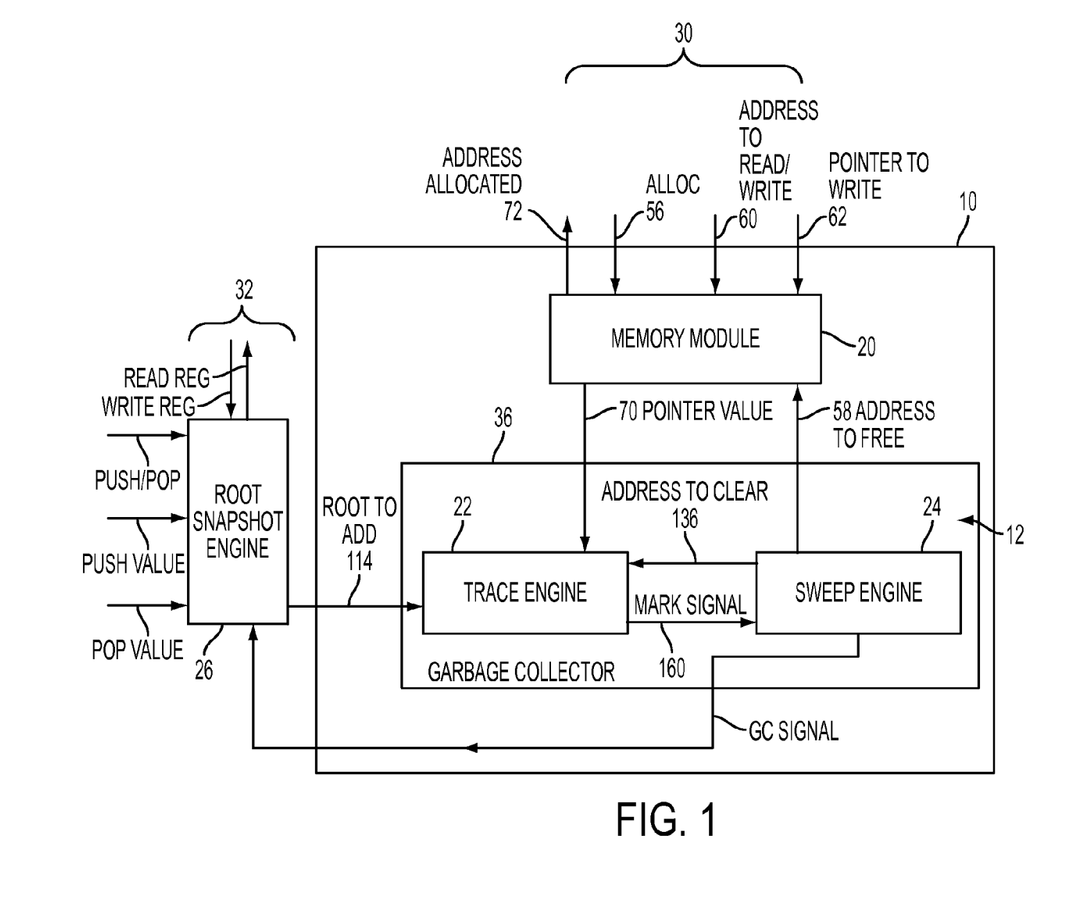
FIG. 1 is a block diagram of an exemplary field-programmable gate array (FPGA) having a garbage collector according to one aspect of the invention.

With reference now to FIG. 1, a block diagram of an exemplary field-programmable gate array (FPGA) 10 is shown having a memory module 20. The FPGA 10 includes various programmable gates 12, which may be programmed to include one or more modules or engines. In the embodiment as shown, the FPGA 10 includes a trace engine 22, a sweep engine 24, and a root snapshot engine 26. The memory module 20 may store configuration information, where a first application interface 30 that is in communication with the memory module 20, which receives programming instructions and communicates information to and from a host (not shown). The memory module 20 is also in communication with the trace engine 22 and the sweep engine 24, where the trace engine receives data from the memory module 20. A second application interface 32 is in communication with the root snapshot engine 26. The root snapshot engine 26 is in communication with a host (not shown) over the second application interface 32. The host may separately communicate with the root snapshot engine 26 over the second application interface 32. The trace engine 22 and the sweep engine 24 create a garbage collector 34.

Although FIG. 1 illustrates an FPGA, it is understood that any type of computing device having a managed memory implemented as one or more hardware circuits using a hardware description language may be used as well such as, for example, an application specific integrated circuit (ASIC)

having appropriate combinational logic gates or a programmable gate array (PGA). The FPGA 10 may be in communication with a client application that is written in a hardware description language such as, for example, very-high-speed integrated circuits hardware description language (VHDL) and Verilog. The FPGA 10 may also be in communication with a client application written in a higher-level software based programming language such as, for example, C, C++, SystemC, Perl, Python, C#, CUDA, Java, OpenCL, or a language that is derived therefrom, where a compiler (not illustrated) converts the higher-level software based programming language into the hardware description language.

In one embodiment, the FPGA 10 is a programmable logic device having 4- or 6-input look-up tables (LUTs) which can be used to implement combinational logic, and flip-flops (not illustrated) which can be used to implement sequential logic. Specifically, several LUTs and flip-flops may be combined together to form a unit called a slice, which is the standard unit in which resource consumption is reported for FPGAs. The FPGA 10 also includes a clock distribution network (not illustrated) for propagating a globally synchronized clock to allow for the use of conventional clocked digital logic. In one embodiment, the global clock may be used to implement an efficient single-cycle atomic root snapshot. The FPGA 10 also contains a relatively large amount of configurable routing resources for connecting the slices, based on the data flow in a hardware description language program. The routing resources are used by a place-and-route (PAR) tool during hardware synthesis.

The FPGA 10 may employ block random access memory (BRAM), which are specialized memory structures that are usually available on FPGAs. For example, some types of FPGAs may have a BRAM capacity of between 1.5 MB to 8 MB of BRAM. One feature of a BRAM type memory is that BRAM may be organized in various form factors (i.e., analogous to word sizes on a central processing unit). One commercially available example of an FPGA is the Virtex®-5 FPGA manufactured by Xilinx Inc., headquartered in San Jose, Calif. One feature of BRAM is that BRAM can be organized in various form factors (analogous to word sizes on a CPU). On the Virtex®-5, form factors of 1, 2, 4, 9, 18, 36, 72, and so on are supported. For example, a 36 KB BRAM can also be used as two logically separate 18 KB BRAMs. Moreover, a denser memory structure may be built by cascading multiple BRAMs horizontally, vertically or, in a hybrid configuration. Any memory structure which is smaller than 18 KB would lead to quantization (i.e., in memory system parlance, this is referred to as fragmentation). The quantization may be considerable, depending on the logical memory structure in the design.

The BRAM may be used as a true dual-ported (TDP) RAM (shown in FIG. 2 as port A and port B) that provides two fully independent read-write ports. A dual-ported memory has ability to simultaneously read and write to different memory cells at different addresses. Moreover, each port on the BRAM memory supports either read, write, read-before-write, and read-after-write operations. It should be noted that the BRAM may also be configured for use as a first in first out (FIFO) queues rather than a random access memory, which is used in the trace engine 22.

Figure 2:
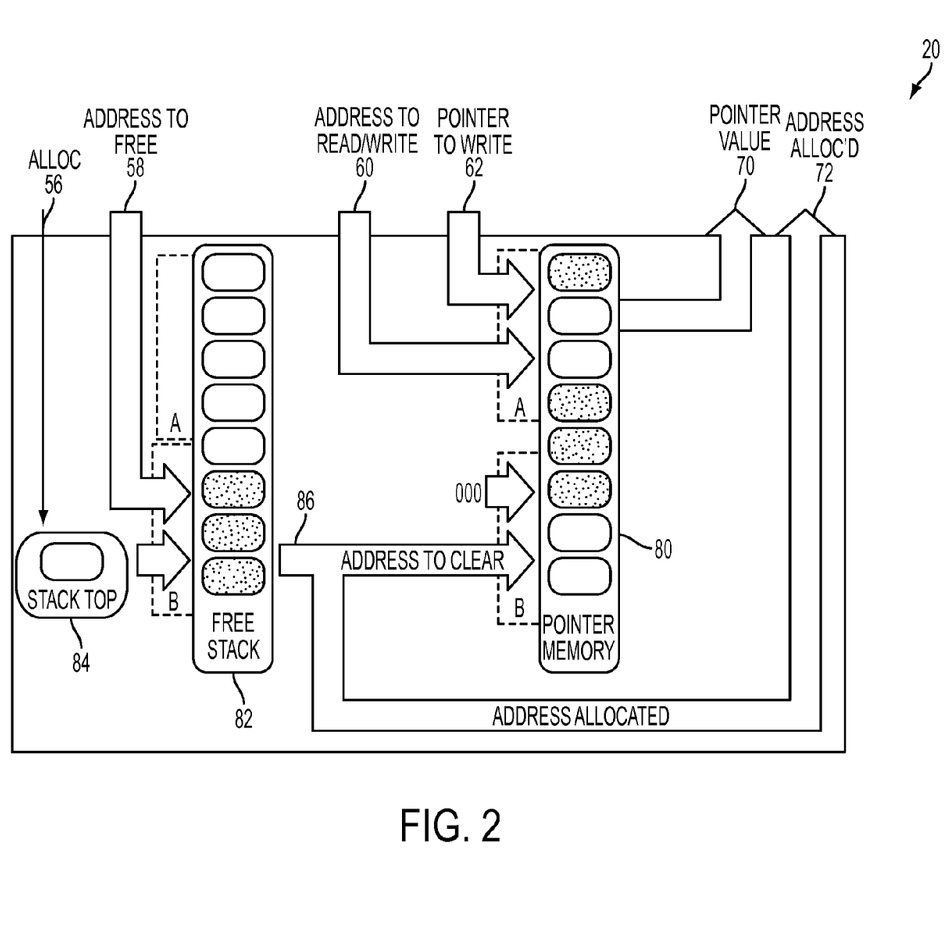
FIG. 2 is a block diagram of a memory module shown in FIG. 1 in accordance with an embodiment of the present invention.

The FGPA 10 includes memory structures (e.g., the memory 80 and 82 as illustrated in FIG. 2) that are typically more uniform than conventional software heaps. Thus, the memory structures in the FPGA 10 are organized into one or more miniheaps, in which objects have a fixed size and shape in terms of pointer and data fields. Each miniheap has an interface allowing objects to be allocated (and freed when using explicit memory management), and operations allowing individual data fields to be read or written. Miniheaps with one or two pointer fields and one or two data fields are generally employed. The quantization as described above may impact efficiency of BRAM utilization. For example, for a miniheap of size N=256, pointers are 8 bits wide, so a single 18 KB BRAM configured as 9 bits wide would be used. However, this wastes 1 bit per entry, but also wastes 1.75K entries, since only 256 (0.25K) entries are needed. The 1 bit wasted per field is a form of internal fragmentation and the 1.75K wasted fields are a form of external fragmentation.

To reduce external fragmentation, multiple fields of the same size may be implemented with a single BRAM set. However, since BRAMs are dual-ported, supporting more than two fields would result in a loss of parallelism in terms of field access. Furthermore, since one BRAM port is used for initialization of fields when allocated, this effect comes into play even with two fields. The opposite approach is also possible: multiple fields can be implemented with a single BRAM set, resulting in a wider data width. In principle this can reduce internal fragmentation. However, in practice, this actually can result in poorer resource allocation because it reduces flexibility for the synthesis tools.

The memory module 20 receives an allocation request 56, an address to free port 58, an address to read/write port 60, and a pointer to write port 62. The allocation request 56 may be a one-bit signal that is used to implement a malloc operation (e.g., dynamic allocation), and is received from a host (not shown) through the first application interface 30. The address to free port 58 is in communication with the sweep engine 24, and the address to read/write port 60 and the pointer to write port 62 are in communication with a host (not shown) through the first application interface 30. The memory module 20 sends a pointer value 70 to the trace engine 22.

A block diagram of the memory module 20 is illustrated in FIG. 2, showing primary data and control fields. Various approaches exist for implementing the miniheap as described above. Fundamentally, the miniheap represents a time/space (and sometimes power) trade-off between the number of available parallel operations, and the amount of hardware resources consumed. Regarding the FPGA 10 shown in FIG. 1, a logical memory block with a desired data width and number of entries is specified, and the synthesis tools attempt to allocate the required number of individual block RAMs as efficiently as possible, using various packing strategies. The BRAMs for such a logical memory block are referred to as a BRAM set. In the various embodiments as described, one BRAM set is used for each field in the object. For example, if there are two pointers and one data field, then there are three BRAM sets. The non-pointer field has a natural width associated with its data type (e.g., 32 bits). However, for a miniheap of size N, the pointer fields are $[\log_2 N]$ bits wide. Thus, because data widths on the FPGA 10 are customizable, the precise number of required bits are used. Thus, a larger miniheap will increase in size not only because of the number of entries, but because the pointer fields become larger. It should be noted that the memory module is the same as in software, where the pointer value 0 is reserved to mean "null", so a miniheap of size N can really only store N−1 objects.

For clarity, a single object field memory 80 is illustrated in FIG. 2, which is of pointer type, and is stored in a single BRAM set. A second set of memory 82 (e.g., a free stack of memory) is also provided to store a stack of free objects. Both the memories 80 and 82 include a dual-port configuration (e.g., having a first port A and a second port B).

The allocation request 56 is sent to a stack top register 84, which is used to hold the value of a stack top of the second set of memory 82. Assuming the value of the stack top register 84 is a non-zero value, the stack top register 84 is decremented and sent to port B of the memory 82, in read mode. A resulting pointer 86 from the memory 82 is also the address allocated port 72. The resulting pointer 86 is also sent to port B of the memory 80, in write mode. A resulting write value of the resulting pointer 86 is hard wired to null (e.g., '000'). To free an object a pointer (e.g., the address to free signal 58) is presented to the memory module 20, and the stack top register 84 is used as the address for the memory 82 on port B, in write mode, with the data value of the address to free signal 58. The stack top register 84 is incremented, which causes a pointer to the freed object to be pushed onto the freed stack of memory 82.

In order to read or write to a field in the pointer memory 80, the address to read write signal 60 is presented, and if writing the pointer to write signal 62 is presented. This utilizes port A of the memory 80 in either read or write mode, resulting in the pointer value 70 in the write mode. Thus, as shown in FIG. 2, the memory module 20 can allow a read or write to proceed in parallel, which is allowed by the dual-ported memories 80 and 82.

Turing back to FIG. 1, the root snapshot engine 26 may use a Yuasa-style snapshot-at-the-beginning algorithm (i.e., an algorithm that uses the snapshot-at-the-beginning strategy to preserve every reference at the beginning of garbage collection, and new objects allocated during garbage collection are also preserved). A root snapshot may be obtained virtually without stopping an application while the snapshot is taken. The root snapshot engine 26 takes two types of roots from one or more mutators, those in the registers and those in the stack.

Figure 3:
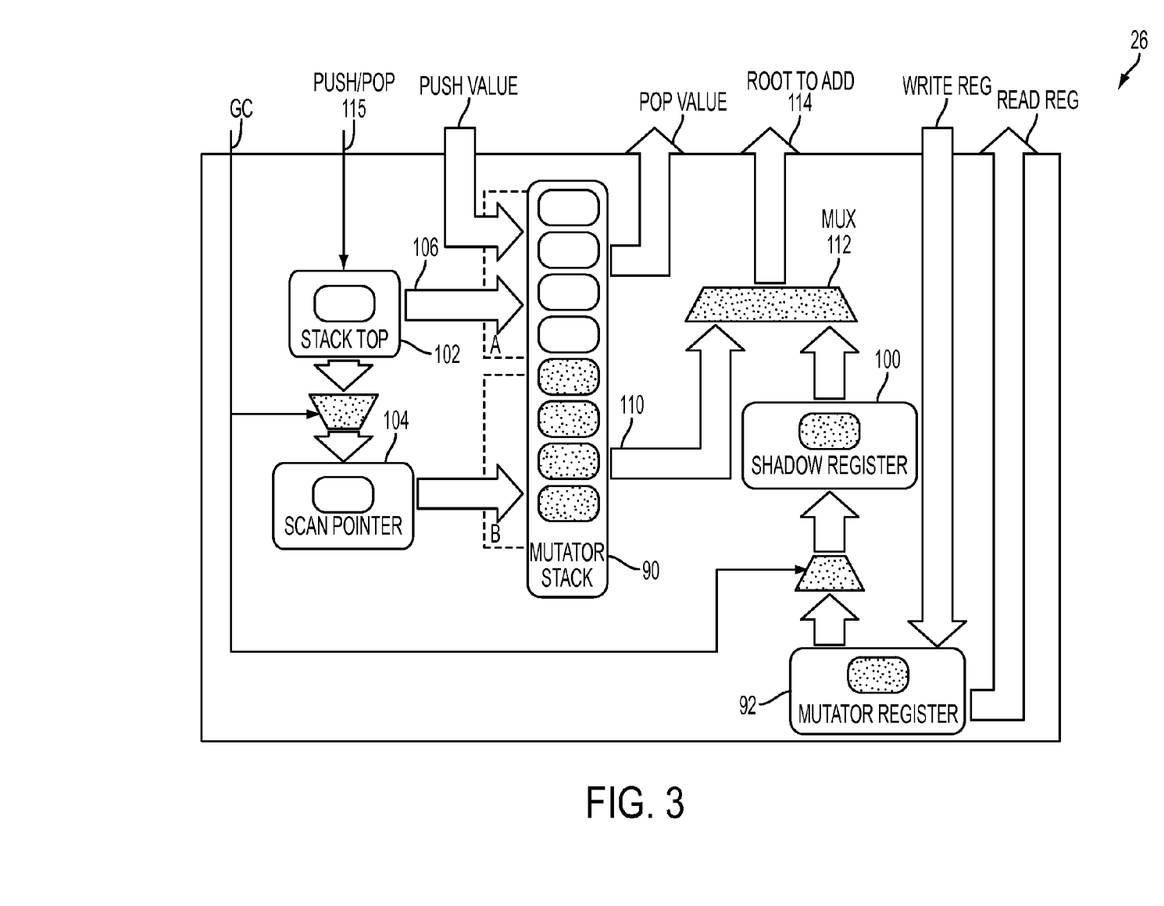
FIG. 3 is a block diagram of a root snapshot engine shown in FIG. 1 in accordance with an embodiment of the present invention.

Referring now to FIG. 3, the root snapshot engine 26 is illustrated with a single mutator stack 90 and a single mutator register 92. The snapshot is controlled by a garbage collector (GC) signal sent from the sweep engine 24 (shown in FIG. 1). The GC signal goes high for one clock cycle at the beginning of collection. The snapshot of the roots is defined as the state of memory at the beginning of a next cycle after the GC signal goes high. A snapshot of the mutator register 92 is obtained by using a shadow register 100. In the cycle after the GC signal goes high, the value of the mutator register 92 is copied into the shadow register 100. This can happen even if the mutator register 92 is also written by the mutator in the same cycle, since the new value will not be latched until the end of the cycle.

The stack snapshot is obtained by having another register in addition to a stack top register 102, which is referred to as a scan pointer register 104. In the same cycle that the GC signal goes high, the value of a stack top register pointer 106 minus one is written into the scan pointer register 104 (because the stack top points to the entry above the actual top value). Beginning in the following cycle, the scan pointer register 104 is used as the source address to port B of the mutator stack 90, and a pointer 110 is read out, going through a multiplexer 112 (MUX) and emerging on a root to add port 114 from the snapshot module. The scan pointer register 104 is also decremented in preparation for the following cycle. It should be noted that the mutator can continue to use the mutator stack 90 via port A of the BRAM set, while the snapshot uses port B of the mutator stack 90. Moreover, because the mutator cannot pop values off the stack faster than a collector can read the values, the property is preserved that the snapshot contains exactly the roots that existed in the cycle following the GC signal.

One feature omitted from FIG. 3 is that a state machine (not shown) is required to sequence the values from the mutator stack 90 and the shadow register 100 through the multiplexer 112 to the root to add port 114. It should be noted that the values from the mutator stack 90 are processed first, because the stack snapshot technique relies on staying ahead of the mutator without any explicit synchronization. If multiple stacks are provided, then a shadow stack will be provided to hold values as they were read out before the mutator could overwrite the hold values, which could then be sequenced onto the root to add port 114. As will be discussed below, the GC signal is only triggered by an allocation request by the mutator that causes free space to drop below a threshold. Therefore, the generation of root snapshot logic only needs to consider the hardware states in which this might occur. Any register or stack not live in those states can be safely ignored.

Figure 4:
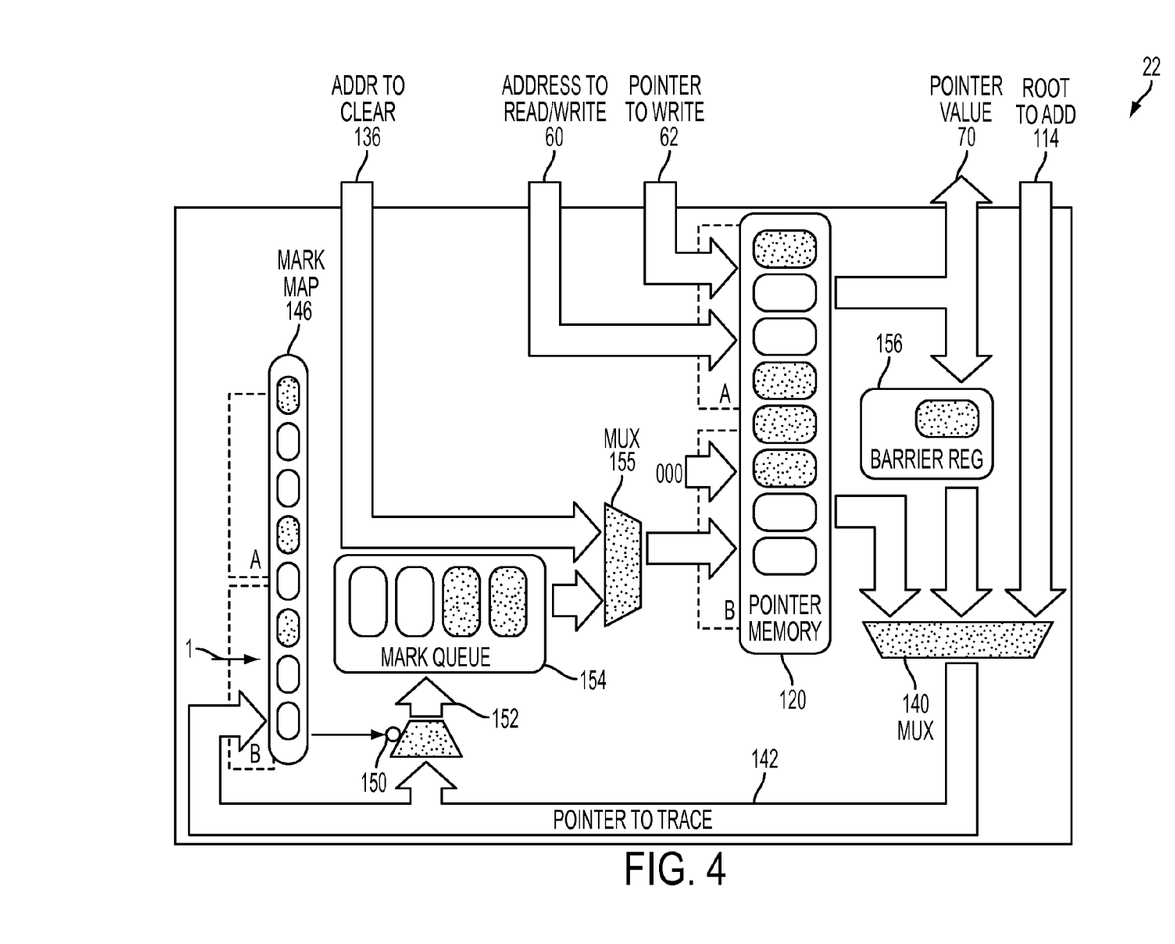
FIG. 4 is a block diagram of a trace engine shown in FIG. 1 in accordance with an embodiment of the present invention.

Turning back to FIG. 1, the trace engine 22 includes a single pointer memory (shown in FIG. 4 as reference number 120). The trace engine 22 provides the same mutator interference as the malloc/free style memory management approach of the memory module 20. In particular, referring to both FIGS. 1 and 4, the trace engine 22 also includes an address to read port 130, a pointer to write port 132, and a pointer value port 70, except that instead of the address to free port 58 (shown in FIG. 2), an address to clear port 136 is provided. Also, the root to add port 114 from the root snapshot engine 26 is provided.

Continuing to refer to FIG. 4, during execution, there are three sources of pointers for the trace engine 22 to trace: externally added roots from the snapshot (e.g., the root to add port 114 from the snapshot engine 26), internally traced roots from the pointer memory 120, and over-written pointers from the pointer memory 120 (which is captured with a Yuasa-style barrier to maintain the snapshot property). The different pointer sources flow through a multiplexer 140, and on each cycle a pointer 142 (e.g., pointer to trace) can be presented to a mark map 146 (which is a dual-ported memory), and contains one bit for each of the N memory locations. Using the BRAM read-before-write mode, an old mark value is read, and then the mark value is unconditionally set to 1. If the old mark value is 0, this pointer has not yet been traversed, so the negation of the old mark value (indicated by the bubble 150) is used to control whether a pointer 152 is added to a mark queue 154 (note that this means that all values in the mark queue 154 have been filtered, so at most N−1 values can flow through the queue). The mark queue 154 is a BRAM used in FIFO (rather than random access) mode.

Pointers from the mark queue 154 are presented as a read address on port B of the pointer memory 120, and if non-null values are fed to a multiplexer 155 back to the marking step. The write barrier is implemented by using port A of the pointer memory 120 BRAM in read-before-write mode. When the mutator writes a pointer, the old value is read out first and placed into a barrier register 156. This is subsequently fed through the multiplexer 140 and marked. Given the three BRAMs involved in the marking process, processing one pointer requires 3 cycles. However, the marking engine is implemented as a 3-stage pipeline, and is able to sustain a throughput of one pointer per cycle.

For objects with two pointers, two trace engines may be provided and paired together to maximize resource usage (not shown). Since each trace engine only uses one port of the mark map, both engines can mark concurrently. Furthermore, the two mark queues are multiplexed together and the next item to mark is always taken from the less full queue. This allows the queues to be of size N/2. On each cycle, one pointer is removed from the queue, and the two pointers in the object retrieved are examined and potentially marked and enqueued. The final optimization is that since there are now two write barrier registers and two mark queues, the write barrier values are not processed until there are two of them. This means that the mark engines can make progress every other cycle even if the application is performing one write per cycle.

The termination protocol for marking is relatively simple: once the last item from the mark queues 154 is popped (both mark queues become empty), it takes 2 or 3 cycles for the trace engine 22 to finish the current pipeline. If the two pointers returned by the heap are null, then the mark process is terminated in the 2nd cycle as there is no need to read the mark bits in this case. Otherwise the mark bit for the non-null pointers are read to ensure that both pointers are marked, in which case the mark phase is terminated in the third cycle.

Write barrier values arriving after the first cycle of termination can be ignored, since by the snapshot property would either have to be newly allocated or else discovered by tracing the heap. However, note that some data structures (e.g., linked lists) will cause a pathological behavior, in which a pointer is marked, removed from the queue, which will appear empty, and then 2 cycles later the next pointer from the linked list will be enqueued. So while the pipeline can sustain marking one object per cycle, pipeline bubbles will occur which reduce that throughput.

Figure 5:
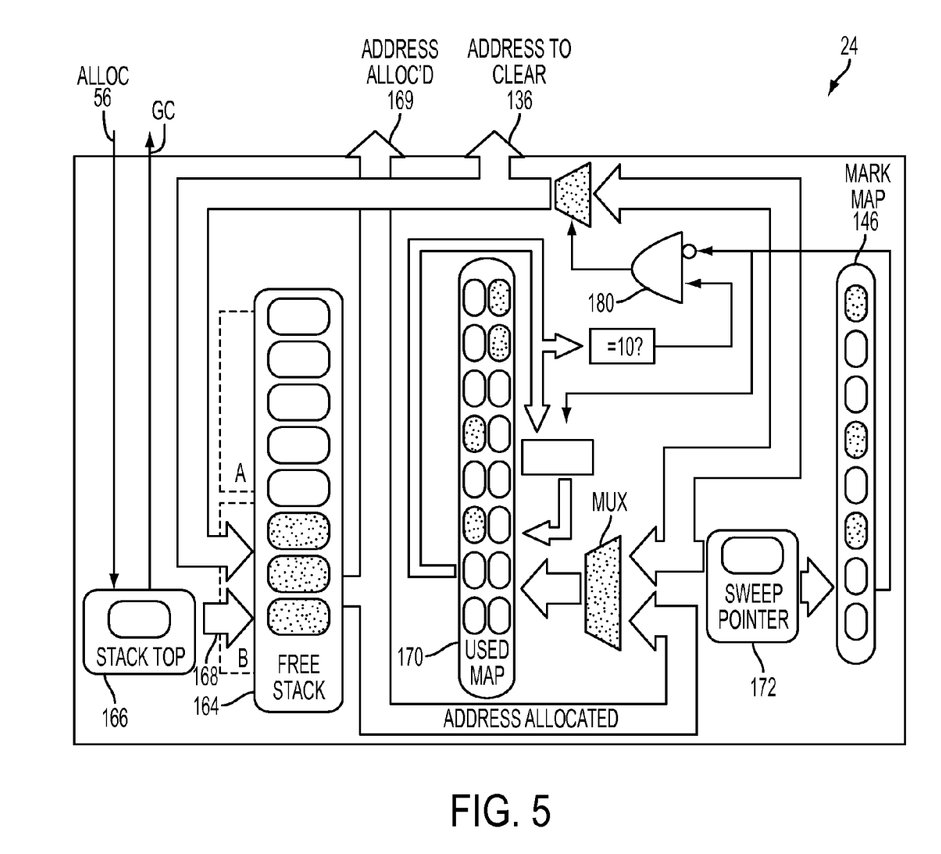
FIG. 5 is a block diagram of a sweep engine shown in FIG. 1 in accordance with an embodiment of the present invention.

Turning back to FIG. 1, the sweep engine 24 is provided, where sweeping will begin during the next machine cycle after the tracing in the trace engine 22 has been completed. During sweeping, memory is reclaimed. A mark signal 160 is sent from the trace engine 22 to the sweep engine 24 to indicate that the tracing has been completed. Referring now to FIG. 5, the sweep engine 24 receives the allocation request 56 from the mutator. The sweep engine 24 handles the allocation request 56 and maintains a stack of pointers to a free memory that is a free stack 164. The sweep engine 24 also includes the mark map 146 of the trace engine 22 (shown in FIG. 4).

When the allocation request 56 is received, a stack top register 166 is used to remove a pointer to a free object from the free stack 164, thereby decrementing a stack pointer 168. If the stack pointer 168 falls below a specified level then the GC signal is triggered by raising the GC signal. Referring to both FIGS. 1 and 4-5, the GC signal is sent from the stack top 166 of the sweep engine 24 to the root snapshot engine 26. In one embodiment, the specified level of the stack pointer 168 is about 25%, however it is to be understood that the specified level may include other values as well. Specifically, the specified level may be based on one or more application and resource parameters such as, for example, allocation rates, mutation rates, live data amount, and memory resource.

The address popped from the free stack 164 is returned to the mutator on an address allocated port 169. The address is also used to set an object's entry in a used map 170 to the value 01, which means "freshly allocated". A value of 00 means "free", in which case the object is on the free stack 164.

Sweeping is a simple linear scan. A sweep pointer 172 initialized to 1 (since slot 0 is reserved for null), and on every cycle (except when pre-empted by allocation) the sweep pointer is presented to both the mark map 146 and the used map 170. If an object is marked, the used map 170 entry is set to '10'. If an object is not marked and the used map 170 entry is '10' (which is indicated by an and gate 180 in FIG. 5) then the used map entry is set to 00. The resulting signal is also used to control whether the current sweep pointer 172 address is going to be freed. If so, the sweep pointer 172 is pushed onto the free stack 164 and also output on the address to clear port 136, which is connected to the mark engine (e.g., the mark map 146) so that the data values being freed are zeroed out.

It should be noted that since clearing only occurs during sweeping, there is no contention for port B of the pointer memory 120 in the trace engine 22 (FIG. 4) between clearing and marking. Furthermore, it should also be noted that an allocation request and a free request may happen in the same cycle (e.g., the stack top 84 as shown in FIG. 2 is accessed using read-before-write mode and returned as the address allocated signal 72, and then the newly freed object is pushed back).

When an object is allocated, the object is not marked. Thus, the garbage collector 36 (shown in FIG. 1) does not allocate black, which means that the tracing engine 22 may encounter newly allocated objects in the marking pipeline (via newly installed pointers in the heap), albeit at most once since the pointer will then be marked. This also affects worst-case execution time (WCET) analysis.

Figure 6:
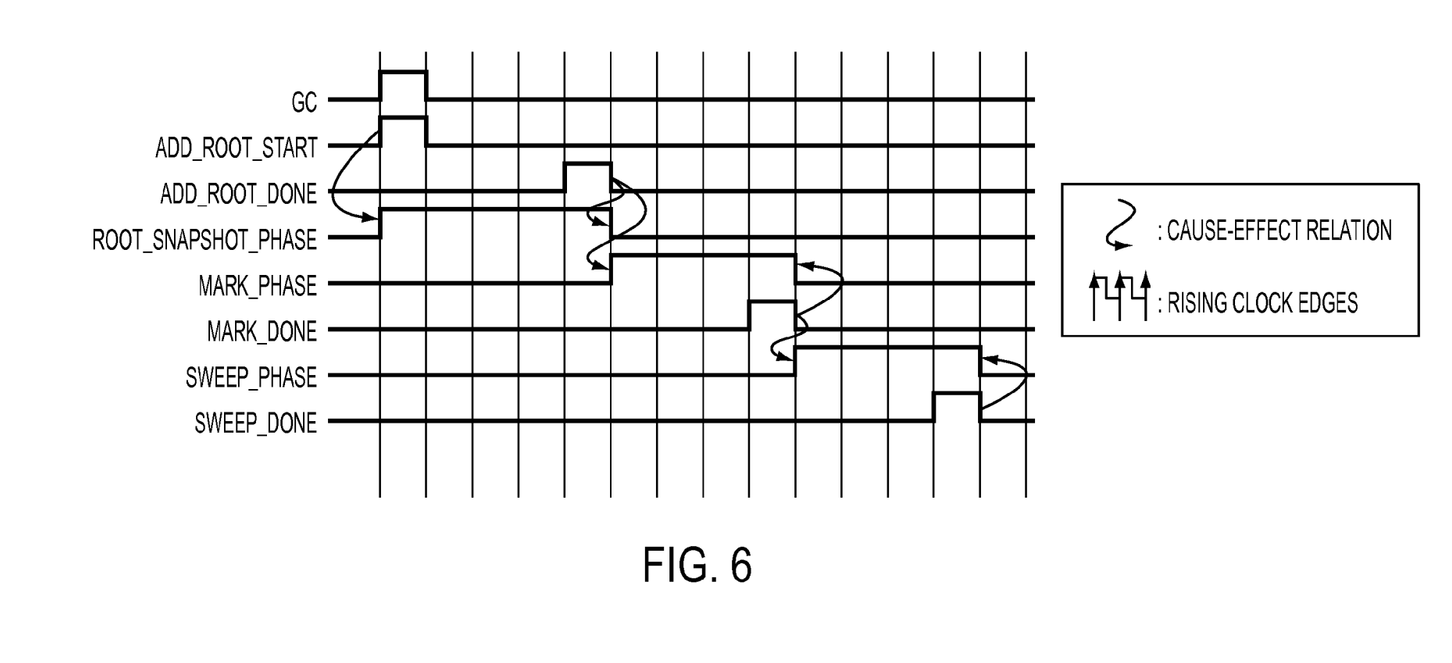
FIG. 6 is a timing diagram of the garbage collector shown in FIG. 1 in accordance with an embodiment of the present invention.

Referring generally to FIGS. 1-5, the configuration of the garbage collector 36 thus allows for mutation and collection to occur unconditionally, in a single cycle. Thus, the minimum mutator utilization (MMU) is about 100%, unless insufficient resources are dedicated to the heap. Turning now to FIG. 6, a timing chart of the garbage collector 36 is illustrated. As shown in FIG. 6, garbage collection is triggered or initiated by the GC signal sent from the sweep engine 24 (shown in FIG. 1). Referring now to FIGS. 1 and 6, the GC signal is triggered if the pointer 168 (of the sweep engine 24 shown in FIG. 5) falls below the specified level (e.g., in one embodiment the specified level is 25%). The GC signal goes high for one clock cycle at the beginning of garbage collection. The root snapshot module 26 receives the GC signal and takes a snapshot of the roots from the mutator during the root snapshot phase.

The root snapshot engine 26 sends the root to add port 114 (e.g., the snapshot of the mutator) to the trace engine 22. Thus initiates a mark phase in the trace engine 22. The trace engine 22 is implemented as a 3-stage pipeline, having a throughput of one pointer per clock cycle. The mark signal 160 is sent from the trace engine 22 to the sweep engine 24 during a mark done phase to indicate that the tracing has been completed. The sweep phase then begins, where memory is reclaimed (e.g., the address to free port 58 sent back to the memory module 20). The GS signal triggered by the sweep engine 24 each time the pointer 168 (of the sweep engine 24 shown in FIG. 5) falls below the specified level.

Unlike software-based garbage collectors, the garbage collector as described in FIGS. 1-6 is fully deterministic, as it is possible to analyze the worst case behavior down to a (machine) cycle. For example, given R is the maximum number of roots and N is the size of the heap, then the worst-case time (in cycles) for garbage collection is:

$$T = T_R + T_M + T_W + T_X + T_S + T_A$$

where $T_R$ is the time to snapshot the roots, $T_M$ is the time (in cycles) to mark, $T_S$ is the time to sweep, and $T_W$ is the time lost to write barriers during marking, $T_X$ is the time lost to blackening newly allocated objects during marking, and $T_A$ is time lost to allocations during sweeping. In the worst case, without any knowledge of the application, $T_R = R+2$, $T_M = 3N+3$, $T_W = 0$ $T_X = 0$, and $T_S = N$.

The reasoning for these quantities will now be explained. During the snapshot phase, one root into the mark queue every cycle may be placed, plus one cycle to start and finish the phase, accounting for R+2. During marking (e.g., performed by the trace engine 22), there could be N objects in the heap, configured as a linked list which causes the mark pipeline to stall for two cycles on each object, plus 3 cycles to terminate. Sweeping (performed by the sweep engine 24) is unaffected by application characteristics, and always takes N cycles. Preemption of the collector by mutator write barriers ($T_W$) does not factor into the worst-case analysis because the write barrier work is overlapped with the collector stalls. Extra mark operations to blacken newly allocated objects ($T_X$) also simply fill stall cycles.

The garbage collector as described in the embodiments shown in FIGS. 1-6 allows an allocation operation in every cycle, but allocation pre-empts the sweep phase, meaning that such an allocation rate can only be sustained in relatively short bursts. The largest sustainable allocation rate is 0.5—otherwise the heap would be exhausted before sweeping completed. Thus, $T_A$=N and $T_{worst}$=R+5N+5.

In one approach, real-time analysis may be performed where μ is the average number of mutations per cycle (μ<1), α is the average number of allocations per cycle (α<0.5), and m is the maximum number of live data objects in the heap at any one time (m<N). The following equations are provided:

$$T_M = 3m + 3,\ T_s = N,\ T_W = \frac{\mu}{2-\mu}m,\ T_A = \frac{\alpha}{1-\alpha}N$$

It should be noted that both α and μ can only be averaged over a time window guaranteed to be less than or equal to the phases which α and μ influence, and m is a safe window size. One inaccuracy may be due to pipeline stalls during marking, for which worst and average case behavior can be very different. Thus, B is the number of pipeline stalls (0≤B≤2m), so $T_M$=m+B+3. For a linked list, B=2m; for three linked lists each with its own root, B=0. For a heap considered as a forest without back-edges, B is bounded by the number of levels of width 1 plus the number of levels of width 2 (when the width is 3 or greater, there is enough parallelism to keep the 3-stage pipeline full and avoid stalls).

Using these application-specific estimates, the WCET of collection is expressed as:

$$T_{max} = R + \left(\frac{1}{1-\alpha}\right)\left(\frac{2}{2-\mu}m + N\right) + B + 5$$

Once the worst-case execution time for collection is known, the minimum heap size in which the collector can run with real-time behavior (zero stalls) is determined, where m objects are available for the live data. While a collection taking time $T_{max}$ takes place, another $\alpha T_{max}$ objects can be allocated (the so-called floating garbage). However, there may be $\alpha T_{max}$ floating garbage when a collection starts, and then another αTmax objects will be allocated during that collection. Thus the minimum heap size is:

$$N_{min} = m + 2\alpha T_{max}$$

If the non-size-dependent portion of $T_{max}$ from the previous equation is denoted as:

$$K = R + \left(\frac{1}{1-\alpha}\right)\left(\frac{2}{2-\mu}m\right) + B + 5,$$

and the following is solved:

$$N_{min} = m + 2\alpha T_{max}$$

$$N_{min} = m + 2\alpha\left(\frac{N_{min}}{1-a} + K\right)$$

$$N_{min} = (m + 2\alpha K)\left(\frac{1-\alpha}{1-3\alpha}\right)$$

A micro-benchmark was performed with three different types of memory management implementations, an explicit (e.g., malloc/free) memory management, real-time collection, and a stop-the-world collector. The comparison was performed using the Virtex®-5 FPGA. It should be noted that when implemented in hardware, the real-time collector is faster, has lower latency, can run more effectively in less space, and consumes less energy when compared to a stop-the-world collector.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computing device, comprising:
a memory module having a memory implemented as at least one hardware circuit, the memory module using a dual-ported memory configuration;
a sweep engine that includes a stack pointer, the sweep engine configured to send a garbage collection signal if the stack pointer falls below a specified level, the sweep engine in communication with the memory module to reclaim memory;
a root snapshot engine configured to take a snapshot of roots from at least one mutator if the garbage collection signal is received from the sweep engine;
a trace engine that receives roots from the root snapshot engine, the trace engine in communication with the memory module to receive data; and
wherein the root snapshot engine includes a shadow register and a mutator register, wherein a value of the mutator register is copied into the shadow register, the root snapshot engine further including a mutator stack and a multiplexer, wherein both the shadow register and the mutator stack are sent through the multiplexer.

2. The computing device of claim 1, wherein the sweep engine is in communication with the memory module by an address to free port.

3. The computing device of claim 1, wherein a pointer that is read from the mutator stack emerges from the multiplexer as the snapshot of roots from the at least one mutator.

4. The computing device of claim 1, wherein an allocation request is received by a stack top register of the sweep engine, and the stack top register is used to remove a pointer to a free object from a free stack that decrements the stack pointer.

5. The computing device of claim 1, wherein the specified level is based on at least one of an allocation rate, a mutation rate, a live data amount, and a memory resource.

6. The computing device of claim 1, wherein the dual-ported memory configuration is a block random access memory (BRAM).

7. The computing device of claim 1, wherein the computing device is one of a field programmable gate array (FPGA), an application specific integrated circuit (ASIC), and a programmable gate array (PGA).

8. The computing device of claim 1, wherein the computing device is in communication with a client application written in a hardware description language.

9. The computing device of claim 8, wherein the hardware description language is one of a very-high-speed integrated circuits hardware description language (VHDL) and Verilog.

10. The computing device of claim 1, wherein the computing device is in communication with a client application written in a software based programming language.

11. The computing device of claim 10, wherein the software based programming language is one of C, C++, SystemC, Perl, Python, C#, CUDA, OpenCL, Java, and a language that is derived therefrom, and wherein a compiler converts the software based programming language into a hardware description language.

12. The computing device of claim 1, wherein the root snapshot engine utilizes a Yuasa-style snapshot-at-the-beginning algorithm.

13. The computing device of claim 1, wherein the trace engine includes a mark map that is a dual-ported memory and a mark queue that is a block random access memory (BRAM) operating in first in first out (FIFO) mode.

14. A method of garbage collection in a computing device, the method comprising:
providing a memory module having a memory implemented as at least one hardware circuit, the memory module using a dual-ported memory configuration;
triggering a garbage collection signal by a sweep engine of the computing device, the sweep engine in communication with a memory module to reclaim memory;
receiving the garbage collection signal by a root snapshot engine of the computing device;
providing a shadow register and a mutator register of the root snapshot engine;
having the garbage collection signal going high for one clock cycle;
copying a value of the mutator register into the shadow register after the garbage collection signal goes high;
sending the shadow register and a mutator through a multiplexer of the root snapshot engine, wherein a pointer that is read from the mutator stack emerges from the multiplexer as the snapshot of roots from the at least one mutator;
taking a snapshot of roots from at least one mutator by the root snapshot engine responsive to the garbage collection signal being received; and
receiving roots from the root snapshot engine by a trace engine of the computing device, the trace engine in communication with the memory module to receive data.

15. The method of claim 14, further comprising triggering the garbage collection signal if a stack pointer of the sweep engine falls below a specified level.

16. The method of claim 15, further comprising receiving an allocation request by a stack top register of the sweep engine, wherein the stack top register is used to remove a pointer to a free object from a free stack that decrements the stack pointer.

17. The method of claim 15, wherein the specified level is based on at least one of an allocation rate, a mutation rate, a live data amount, and a memory resource.

18. The method of claim 14, further comprising providing an address to free port to the sweep engine, wherein the memory module is in communication with the sweep engine by the address to free port.

19. The method of claim 14, further comprising sending a pointer value from the memory module to the trace engine.

20. The method of claim 14, further comprising allowing a read and a write operation to proceed in parallel by the dual-ported memory configuration of the memory module.

21. The method of claim 14, further comprising communicating with the computing device with a client application that is written in a hardware description language.

22. The method of claim 21, wherein the hardware description language is one of a very-high-speed integrated circuits hardware description language (VHDL) and Verilog.

23. The method of claim 14, further comprising communicating with the computing device by a client application that is written in a software based programming language.

24. The method of claim 23, wherein the software based programming language is one of C, C++, SystemC, Perl, Python, C#, CUDA, OpenCL, Java, and a language that is derived therefrom, and wherein a compiler converts the software based programming language into a hardware description language.

* * * * *